United States Patent
Hirose et al.

(10) Patent No.: US 10,680,862 B2
(45) Date of Patent: Jun. 9, 2020

(54) RECEIVER, RECEPTION METHOD FOR RECEIVING FSK SIGNALS

(71) Applicant: JVC KENWOOD Corporation, Yokohama-shi, Kanagawa (JP)

(72) Inventors: Koji Hirose, Yokohama (JP); Toru Fujimoto, Yokohama (JP)

(73) Assignee: JVC KENWOOD CORPORATION, Yokohama-shi (JP)

( * ) Notice: Subject to any disclaimer, the term of this patent is extended or adjusted under 35 U.S.C. 154(b) by 0 days.

(21) Appl. No.: 16/354,499

(22) Filed: Mar. 15, 2019

(65) Prior Publication Data
US 2019/0296949 A1   Sep. 26, 2019

(30) Foreign Application Priority Data

Mar. 20, 2018 (JP) .................................. 2018-052769
Mar. 20, 2018 (JP) .................................. 2018-052770

(51) Int. Cl.
*H04L 27/152* (2006.01)
*H04L 7/00* (2006.01)
*H04B 1/28* (2006.01)
*H04L 27/16* (2006.01)
*H04L 27/14* (2006.01)

(52) U.S. Cl.
CPC ............ *H04L 27/152* (2013.01); *H04B 1/28* (2013.01); *H04L 7/0016* (2013.01); *H04L 7/0087* (2013.01); *H04L 27/16* (2013.01); *H04L 27/142* (2013.01)

(58) Field of Classification Search
CPC ... H04L 7/0016; H04L 7/0087; H04L 27/152; H04L 27/16; H04L 27/142; H04B 1/28
See application file for complete search history.

(56) References Cited

U.S. PATENT DOCUMENTS

| | | | |
|---|---|---|---|
| 2005/0089120 A1* | 4/2005 | Quinlan ................ | H04L 27/156 375/335 |
| 2007/0205833 A1* | 9/2007 | Mar ........................ | H03L 7/095 331/16 |
| 2010/0041357 A1* | 2/2010 | Wang ................... | H04L 27/0014 455/208 |
| 2010/0239051 A1* | 9/2010 | Kathiresan .......... | H04L 27/1525 375/329 |
| 2011/0080195 A1* | 4/2011 | Orino ........................ | H03J 7/04 327/155 |
| 2016/0226686 A1* | 8/2016 | Hafuka ............... | H04L 27/1525 |

FOREIGN PATENT DOCUMENTS

JP          200828961 A      2/2008

* cited by examiner

*Primary Examiner* — Syed Haider
(74) *Attorney, Agent, or Firm* — Brundidge & Stanger, P.C.

(57) ABSTRACT

A mixer is connected to a signal generator and an antenna and outputs a signal at an intermediate frequency. A PLL demodulator subjects the signal at the intermediate frequency from the mixer to PLL demodulation. An amplifier amplifies a signal from the PLL demodulator. A detector detects an amount of shift occurring in the PLL demodulator. A detector detects a gain of the amplifier. An FSK demodulator subjects a signal from the amplifier to FSK demodulation. An AFC unit detects a frequency offset in the signal from the amplifier and causes the signal generator to make a correction for the frequency offset detected.

5 Claims, 6 Drawing Sheets

RECEIVER, RECEPTION METHOD FOR RECEIVING FSK SIGNALS

CROSS-REFERENCE TO RELATED APPLICATION

This application is based upon and claims the benefit of priority from the prior Japanese Patent Application No. 2018-052769, filed on Mar. 20, 2018, and Japanese Patent Application No. 2018-052770, filed on Mar. 20, 2018, the entire contents of which are incorporated herein by reference.

BACKGROUND OF THE INVENTION

1. Field

The present invention relates to reception technologies and, more particularly, to a receiver and a reception method for receiving FSK signals.

2. Description of the Related Art

In digital radio communication, frequency shift keying (FSK) is used by way of example. In a digital radio communication scheme like this, direct current (DC) offset information, etc. is extracted from a detection signal in order to remove the impact from a DC offset, etc. The reference frame synchronization word is corrected based on the information before performing a correlation process (see, for example, patent document 1).

[patent document 1] JP2008-28961

In order to improve reception characteristics, it is necessary to reduce the impact from a frequency offset as well as the impact from a DC offset. It is also necessary to properly set the gain for amplifying the received signal. Meanwhile, if the process becomes complicated as a result of these measures, the circuit scale will be enlarged, and the cost will be increased.

SUMMARY OF THE INVENTION

A receiver according to an embodiment is provided with (1) a preparation mode and (2) a reception mode, the receiver including: a signal generator; a mixer that is connected to the signal generator and an antenna and outputs a signal at an intermediate frequency; a PLL demodulator that subjects the signal at the intermediate frequency from the mixer to PLL demodulation; a detector that detects an amount of shift occurring in the PLL demodulator; an FSK demodulator that subjects a signal from the PLL demodulator to FSK demodulation; and an AFC unit that detects a frequency offset in the signal from the PLL demodulator and causes the signal generator to make a correction for the frequency offset detected. In (1) the preparation mode, the signal generator outputs a signal at the intermediate frequency; the mixer outputs the signal at the intermediate frequency from the signal generator, and the detector detects the amount of shift in the signal from the PLL modulator, and, in (2) the reception mode, the signal generator outputs a local oscillation signal, the mixer outputs the signal at the intermediate frequency based on the local oscillation signal from the signal generator and a signal at a radio frequency from the antenna, the FSK demodulator performs FSK demodulation by using the amount of shift detected by the detector, and the AFC unit detects a frequency offset by using the amount of shift detected by the detector.

Another embodiment also relates to a receiver. The receiver is provided with (1) a preparation mode and (2) a reception mode, the receiver including: a signal generator; a mixer that is connected to the signal generator and an antenna and outputs a signal at an intermediate frequency; a PLL demodulator that subjects the signal at the intermediate frequency from the mixer to PLL demodulation; an amplifier that amplifies a signal from the PLL demodulator; a detector that detects a gain of the amplifier; and an FSK demodulator that subjects a signal from the amplifier to FSK demodulation. In (1) the preparation mode, the signal generator outputs a signal at a zeroth frequency (f0), a signal at a first frequency (f1>f0), and a signal at a second frequency (f2<f0) in a band of the intermediate frequency, the mixer outputs the signal at the zeroth frequency (f0), the signal at the first frequency (f1>f0), and the signal at the second frequency (f2<f0) from the signal generator; the detector detects a zeroth voltage in the case of the zeroth frequency (f0) and detects a gain based on a first voltage in the case of the first frequency (f1) and a second voltage in the case of the second frequency (f2), and in (2) the reception mode, the signal generator outputs a local oscillation signal, the mixer outputs the signal at the intermediate frequency based on the local oscillation signal from the signal generator and a signal at a radio frequency from the antenna, the amplifier amplifies the signal from the PLL demodulator by the gain detected by the detector, and the FSK demodulator performs FSK demodulation by using the zeroth voltage detected by the detector.

Another embodiment relates to a reception method. The method is adapted for a receiver including: a signal generator; a mixer that is connected to the signal generator and an antenna and outputs a signal at an intermediate frequency; a PLL demodulator that subjects the signal at the intermediate frequency from the mixer to PLL demodulation; a detector that detects an amount of shift occurring in the PLL demodulator; an FSK demodulator that subjects a signal from the PLL demodulator to FSK demodulation; and an AFC unit that detects a frequency offset in the signal from the PLL demodulator and causes the signal generator to make a correction for the frequency offset detected, the receiver being provided with (1) a preparation mode and (2) a reception mode, the reception method including: in (1) the preparation mode, outputting, using the signal generator, a signal at the intermediate frequency; outputting, using the mixer, the signal at the intermediate frequency from the signal generator, and detecting, using the detector, the amount of shift in the signal from the PLL modulator, and in (2) the reception mode, outputting, using the signal generator, a local oscillation signal, outputting, using the mixer, the signal at the intermediate frequency based on the local oscillation signal from the signal generator and a signal at a radio frequency from the antenna, performing, using the FSK demodulator, FSK demodulation by using the amount of shift detected by the detector, and detecting, using the AFC unit, a frequency offset by using the amount of shift detected by the detector.

Optional combinations of the aforementioned constituting elements, and implementations of the embodiments in the form of methods, apparatuses, systems, recording mediums, and computer programs may also be practiced as additional modes of the embodiments.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE PREFERRED EMBODIMENT

The invention will now be described by reference to the preferred embodiments. This does not intend to limit the scope of the present invention, but to exemplify the invention.

A summary of the prevent invention will be given before describing the invention in specific detail. An embodiment relates to a receiver for receiving a signal in which the frequency of the carrier wave is varied depending on the data. Such a modulation scheme is called frequency modulation (FM) in analog modulation and FSK in digital modulation. Alternatively, these schemes may be generically referred to as FM. This specification uses the term FM to refer only to analog modulation or use the term FM to cover both analog modulation and digital modulation. An inexpensive integrated circuit for performing the PLL modulation scheme is used in a related-art inexpensive receiver. Meanwhile, a receiver is expected to recover the carrier wave of the received signal by using the baseband signal demodulated from the received signal and to subject the received signal to quadrature detection by using the carrier wave in order to improve reception characteristics. However, a complicated process is required for the purpose and an expensive AD converter, digital signal processor (DSP), dedicated IC, etc. capable of subjecting an intermediate frequency signal to analog-to-digital conversion at a high speed are necessary.

Further, in the case the radio device is applied to digital modulation, it is necessary, for the purpose of M-ary FSK demodulation, to know or adjust demodulation levels corresponding to M-ary FSK modulation levels, instead of performing simple AC component detection. In the case a DSP and a dedicated IC are used, demodulation levels are acquired by these components. In the case that these components are not used and an inexpensive IC for performing the PLL modulation scheme is used, the device is caused to receive a reference signal from a signal generator in a production line. The amplitude is measured and saved, and the modulation levels at reception are calculated at the point of use based on the saved result. Use of a signal generator separate from the radio device requires extra steps in a production line and cannot deal with variations such as temporal variation, temperature variation, variation in calibration etc. conducted in the respective ICs.

The embodiment is directed to realizing a radio device compatible with M-ary FSK by using an inexpensive IC for performing the PLL modulation scheme and without using an expensive DSP. The embodiment is also directed to easily acquiring the gain of an amplifier suitable for the inexpensive IC for performing the PLL modulation scheme in order to acquire demodulation levels compatible with M-ary FSK.

Figure 1:
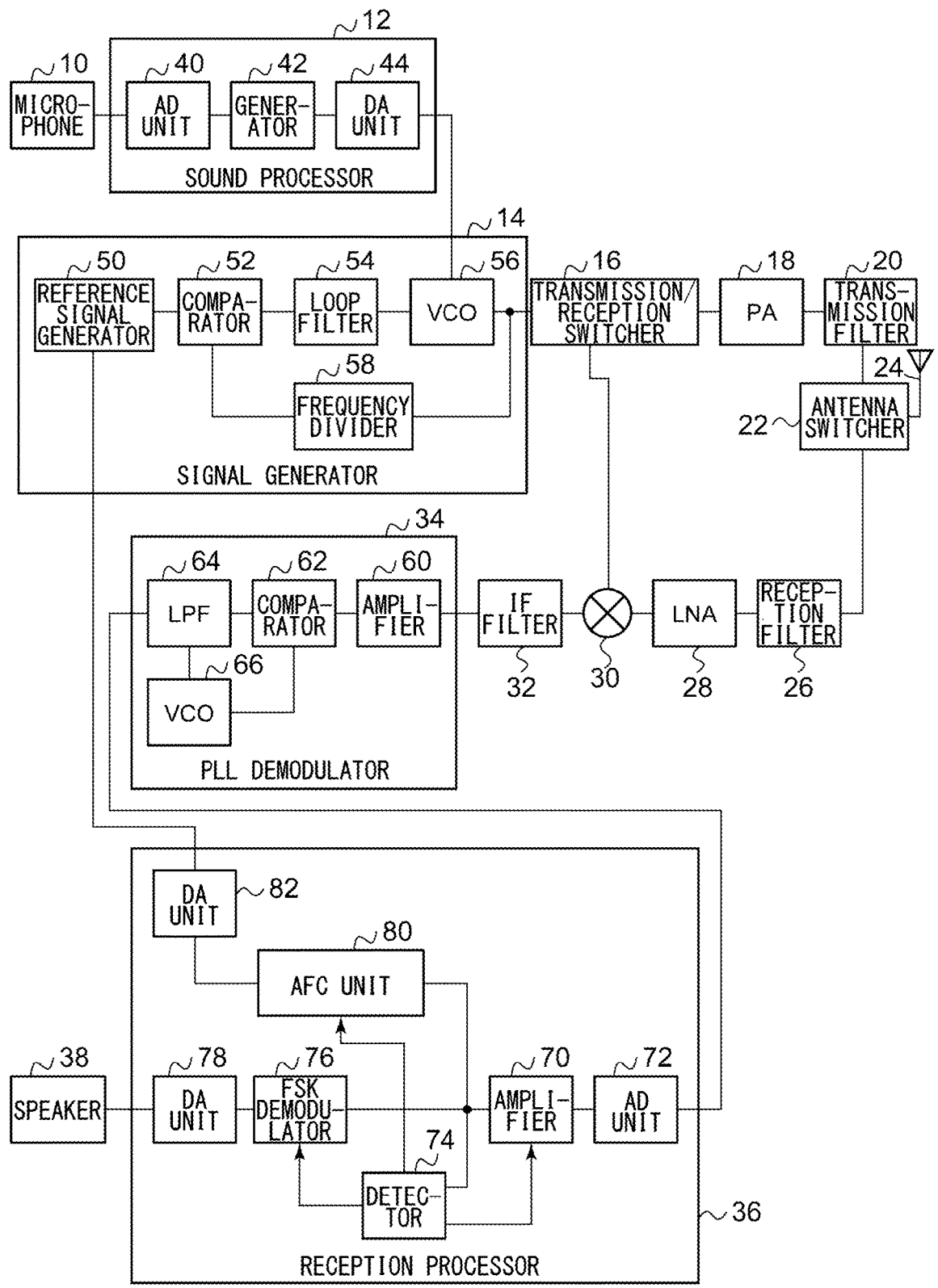
FIG. 1 shows a configuration of a radio device according to an embodiment.

FIG. 1 shows a configuration of a radio device 100. The radio device 100 includes a microphone 10, a sound processor 12, a signal generator 14, a transmission/reception switcher 16, a power amplifier (PA) 18, a transmission filter 20, an antenna switcher 22, an antenna 24, a reception filter 26, a low noise amplifier (LNA) 28, a mixer 30, an IF filter 32, a PLL demodulator 34, a reception processor 36, and a speaker 38. The sound processor 12 includes an AD unit 40, a generator 42, and a DA unit 44. The signal generator 14 includes a reference signal generator 50, a comparator 52, a loop filter 54, a VCO 56, and a frequency divider 58. The PLL demodulator 34 includes an amplifier 60, a comparator 62, an LPF 64, and a VCO 66. The reception processor 36 includes an AD unit 72, an amplifier 70, a detector 74, an FSK demodulator 76, a DA unit 78, an AFC unit 80, and a DA unit 82. The configuration of the radio device 100 will be described in the order of (1) transmission mode, (2) basic operation in the reception mode, (3) preparation mode for AFC, (4) preparation mode for setting of gain, and (5) reception mode. Of these, it can be said that (2) basic operation in the reception mode, (3) preparation mode for AFC, (4) preparation mode for setting of gain, (5) and reception mode are performed in the receiver in the radio device 100.

(1) Transmission Mode

The microphone 10 receives sound. The AD unit 40 converts the received sound into digital data, and the generator 42 generates FSK modulation waveform data by subjecting the digital data to mapping and digital filtering. The DA unit 44 converts the FSK modulation waveform data into an analog modulation signal. The signal generator 14 is comprised of a reference signal generator 50, a comparator 52, a loop filter 54, a VCO 56, and a frequency divider 58 and generates a carrier signal at the transmission frequency, i.e., a local oscillation signal according to the PLL scheme. Modulation is performed in the VCO 56 by superimposing the modulation signal on the frequency-controlled voltage output from the loop filter 54. The modulated transmission signal is amplified to a desired level by the PA 18 via the transmission/reception switcher 16. The amplified signal has unnecessary signals such as high frequencies reduced by the transmission filter 20 and is transmitted via the antenna switcher 22 and the antenna 24.

(2) Basic Operation in the Reception Mode

In the reception mode, the antenna switcher 22 is set to the reception side. The signal received by the antenna 24 has out-of-band signals attenuated by the reception filter 26, is subject to low-noise amplification in the LAN 28 and input to the mixer 30. In the reception mode, the signal generator 14 used in the transmission mode generates a local oscillation signal at a frequency representing a difference or a sum of the reception frequency and the If. The signal generator 14 drives the transmission/reception switcher 16 and feeds the local oscillation signal to the mixer 30. The mixer 30 is connected to the signal generator 14 and the antenna 24 and outputs a signal at the IF by multiplying the local oscillation signal and the received signal. The signal at the ID has components other than those in the IF band reduced by the IF filter 32 and is input to the PLL demodulator 34.

Figure 2:
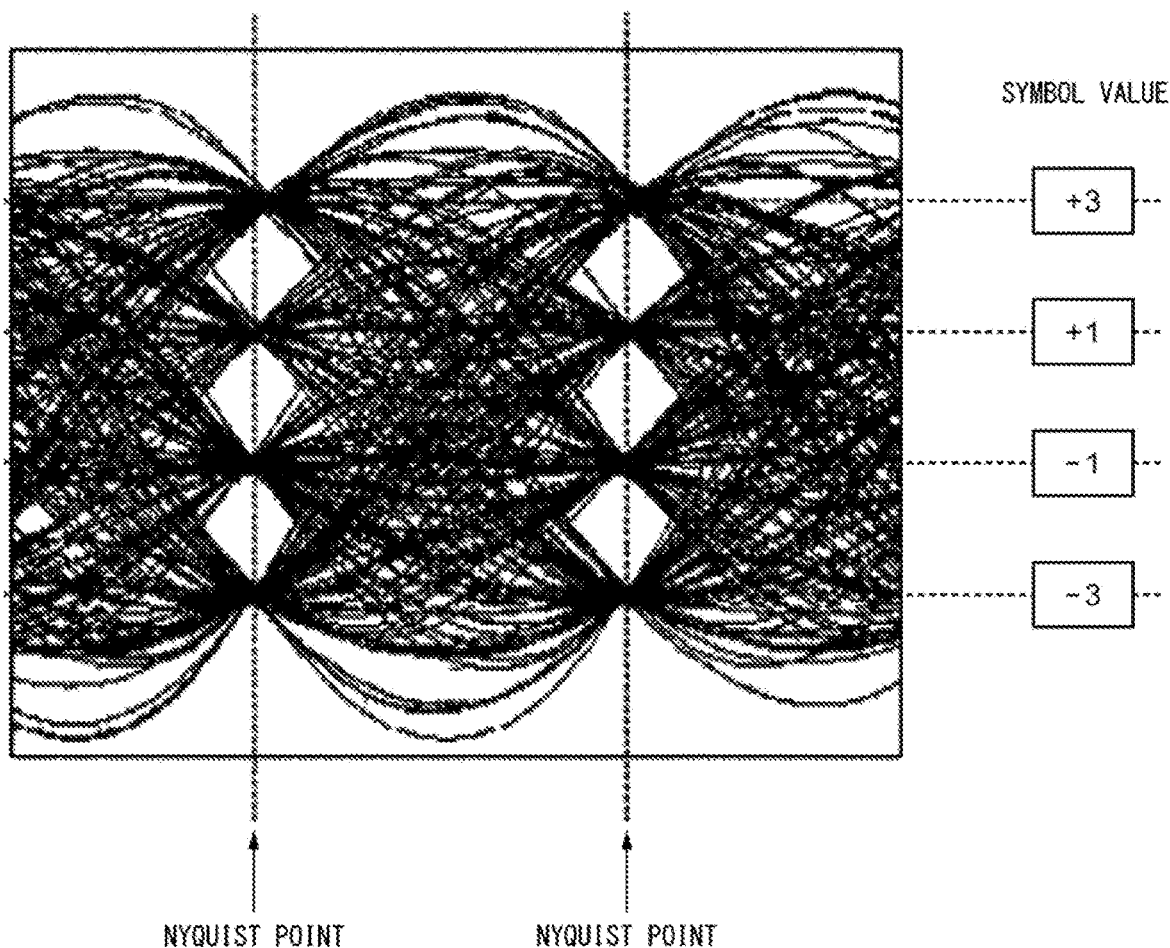
FIG. 2 shows a signal derived from demodulation in the PLL demodulator of FIG. 1.

The PLL demodulator 34 subjects the signal at the IF from the mixer 30 to PLL demodulation. The baseband signal subjected to PLL demodulation is as shown in FIG. 2. FIG. 2 shows a signal derived from demodulating an M-ary FSK signal in the PLL demodulator 34. The M-ary FSK modulation in this case is assumed to be 4-ary FSK modulation.

In demodulation of an M-ary FSK modulated signal, data decision is performed by referring to the voltage level of the demodulated baseband signal. Reference is made back to FIG. 1. The AD unit 72 generates digital baseband waveform data by subjecting the signal demodulated by the PLL demodulator 34 to analog/digital conversion. The amplifier 70 amplifies the signal of the digital baseband waveform data from the AD unit 72. The gain in the amplifier 70 will be discussed later.

The FSK demodulator 76 subjects the digital baseband waveform data amplified by the amplifier 70 to FSK demodulation. In other words, the FSK demodulator 76 samples the voltage value of the digital baseband waveform data according to the timing defined by the data clock of the FSK data recovered from the digital baseband waveform and recovers the data by referring to the sampled voltage value. In the case of 4-ary FSK modulation, 2-bit data is assigned to each of the four voltages assigned to the demodulation levels as shown in FIG. 2. A determination as to which of the demodulation levels represented by the four symbol values is the closest is made according to the decision timing defined by the data clock, i.e., at the four Nyquist points in FIG. 2. Sound data is recovered from the recovered data, and the sound data is converted into an analog signal by the DA unit 78 before being output as received sound from the speaker 38.

Figure 3:
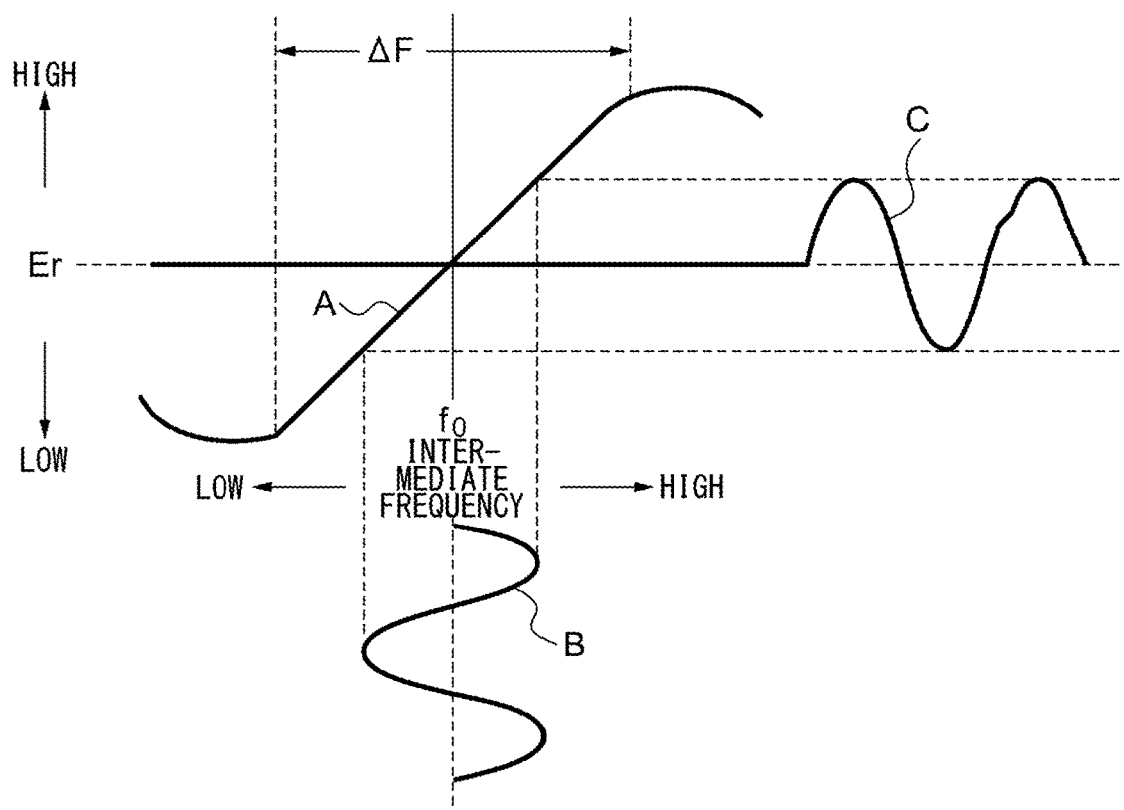
FIG. 3 shows the characteristics of the PLL demodulator of FIG. 1.

A description will be given of an issue in the reception mode. FIG. 3 shows the characteristics of the PLL demodulator 34. In PLL demodulation, a voltage commensurate with the difference in frequency and phase between the output signal of the VCO 66 in the PLL demodulator 34 and the input signal is output as a demodulation signal. If the output central frequency of the VCO 66 is shifted from the central frequency f0 of the input signal B due to variation in ICs or the temperature drift, the shift is output as a DC offset. Similarly, an DC offset is also induced in the output signal C when the central frequency f0 of the input signal B is different from the central frequency of the VCO 66 due to a frequency offset from the transmission side. In the case a signal like this is subject to data decision as an M-ary FSK demodulation signal, the signal as shown in FIG. 2 will be detected, but the amplitudes or DC offsets thereof is subject to variation, which makes it impossible to set the demodulation levels at optimal levels and results in a data decision error.

The free-run central frequency of the VCO 66 is shifted from the predefined IF due to variation in ICs or the temperature, and the shift is output as a DC offset in the output signal C from the PLL demodulator 34. Even if the frequency of the VCO 66 is not shifted, a DC offset is similarly output if there is a shift from the frequency adjusted on the transmission side. Moreover, the gradient of the input frequency vs. output voltage of the PLL demodulator 34 is also subject to variation due to variation in ICs or the temperature. In the case of analog FM, a DC offset does not present any problem if it is cut in a DC cut by a capacitor, etc. The gradient of the input frequency vs. output voltage may change slightly, but that only results in a slight change in the volume of the demodulated sound. In the case of FSK modulation, however, the demodulation levels associated with the respective symbol values are subject to variation if the baseband signal as shown in FIG. 2 contains a DC offset or variation in the gradient of the input frequency vs. output voltage.

Further, when a digital modulation signal is received at a sufficient level and when data decision is made at the Nyquist points in FIG. 2, i.e., when reception synchronization is established, the voltage value at a Nyquist is one of the voltage values associated with the respective symbol values. The voltage values associated with the respective symbol values are uniquely determined by the input frequency vs. output voltage characteristics and the DC offset of the PLL demodulator 34 and by the modulation depth/the specification of a waveform shaping filter defined in the standard for digital radio modulation. The gain of the amplifier 70 should be set so that the voltages at the Nyquist points are as close as possible to the voltage values associated with the respective symbol values.

(3) Preparation Mode for AFC

In the preparation mode, the signal generator 14 generates a continuous wave (CW) signal at the IF, drives the transmission/reception switcher 16 to output the CW signal to the PLL demodulator 34 via the mixer 30 and the IF filter 32. The frequency here is the zeroth frequency (f0) within the IF band. Therefore, the PLL demodulator 34 outputs a DC voltage proportional to the difference between the free-run frequency of the VCO 66 in the PLL demodulator 34 and the zeroth frequency (f0) of the signal output from the signal generator 14. The DC voltage represents a DC offset induced by a shift of the free-run central frequency of the VCO 66 in the PLL demodulator 34 from the preset IF due to variation in ICs or the temperature. The detector 74 measures the shift and stores the shift as the basic DC offset voltage Offset0. The basic DC offset voltage Offset0 is also called the zeroth voltage in the case of the zeroth frequency (f0). The FSK demodulator 76 described later can cancel the DC offset that depends on the variation between the PLL demodulators 34 by subtracting the zeroth voltage from the demodulation level. By canceling the DC offset properly, it is also possible to cancel a DC offset induced by the temperature.

The signal generator 14 outputs a CW signal at IF+$\Delta$f, and the detector 74 measures the demodulation output voltage of the PLL demodulator 34 and stores the voltage as Offset1. IF+$\Delta$f is called the first frequency (f1>f0), and Offset1 is called the first voltage in the case of the first frequency (f1). The first frequency (f1) is also within the IF band. Further, the signal generator 14 outputs a CW signal at IF−$\Delta$f, and the detector 74 measures the demodulation output voltage of the PLL demodulator 34 and stores the voltage as Offset2. IF−$\Delta$f will be referred to as a second frequency (f2<f0), and Offset2 will be referred to as a second voltage in the case of the second frequency (f2). The second frequency (f2) is also within the IF band. By using the maximum deviation frequency of digital modulation as the value of $\Delta$f, the value can also be used for decision of the demodulation levels in digital modulation. In other words, the signal generator 14 outputs several types of CW signals at frequencies slightly shifted from the zeroth frequency (f0), and the detector 74 measures the DC voltages output from the PLL demodulator 34 for the respective frequencies.

The detector 74 calculates the gradient of the input frequency vs. output voltage of the PLL demodulator 34, i.e., the voltage variation per unit frequency. To describe it more specifically, the detector 74 calculates the voltage variation amount $\Delta f_{coeff}$ of the demodulation output per unit frequency.

$$\Delta f_{coeff} = (\text{Offset1} - \text{Offset2})/(2 \times \Delta f)$$

The voltage variation amount $\Delta f_{coeff}$ of the demodulation output per unit frequency is an amount of shift that occurs in the PLL demodulator 34 and is used to calculate a correction value for making a correction for the frequency offset. The voltage variation amount $\Delta f_{coeff}$ of the demodulation output per unit frequency may be used to determine the demodulation levels in FSK demodulation.

(4) Preparation Mode for Setting of Gain

In the preparation, the detector 74 sets an initial value $G_{design}$ as the gain of the amplifier 70. As in the case of the preparation mode for AFC, the signal generator 14 outputs a CW signal at the zeroth frequency (f0), a CW signal at the first frequency (f1>f0), and a CW signal at the second frequency (f2<f0) within the IF band. Further, the mixer 30 outputs a CW signal at the zeroth frequency (f0), a CW signal at the first frequency (f1>f0), and a CW signal at the second frequency (f2<f0) from the signal generator 14. Further, the detector 74 detects the zeroth voltage in the case of the zeroth frequency (f0), the first voltage in the case of the first frequency (f1), and the second voltage in the case of the second frequency (f2). These processes may be performed in (4) and in (3) Preparation mode for AFC in common.

The first frequency (f1) is defined to correspond to the highest frequency of the signal output from the mixer 30 in (1) reception mode, and the second frequency (f2) is defined to correspond to the lowest frequency of the signal output from the mixer 30 in (2) reception mode. In the case of 4-ary FSK modulation, the four values −3, −1, +1, and +3 are defined so that the first frequency (f1) represents the frequency corresponding to the +3 level, and the second frequency (f2) represents the frequency corresponding to the −3 level. Denoting the first voltage as L(+3) and the second voltage as L(−3) below, the design values are denoted by D(+3) and D(−3), respectively. Theoretical values are used for the design values.

The detector 74 derives the gain of the amplifier 70 from L(+3), L(−3), D(+3), and D(−3) in the following manner.

Gain=$G_{design}$×{D(+3)−D(−3)}/{L(+3)−L(−3)}

The derived gain is set in the amplifier 70.

Since the FSK frequency keying differs depending on the protocol so that the aforementioned process is performed for each protocol in the case the device is compatible with a plurality of protocols.

(5) Reception Mode

Figure 4:
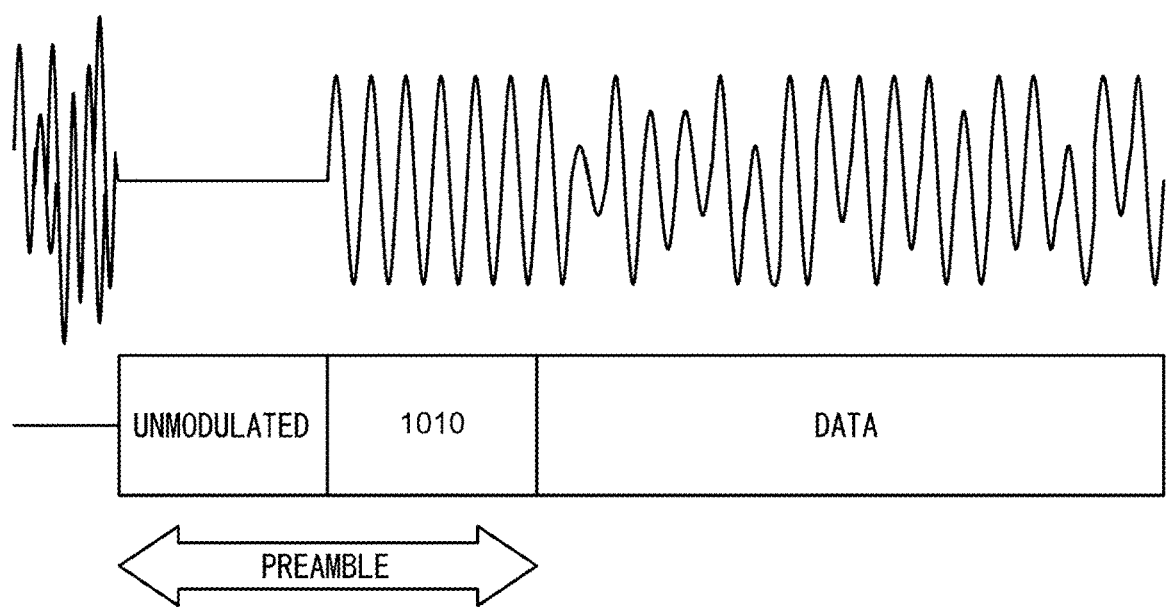
FIG. 4 shows a moving average process in the AFC unit in FIG. 1.

The amplifier 70 amplifies the signal of the digital baseband waveform data from the AD unit 72 by the gain detected by the detector 74. The AFC unit 80 refers to the digital baseband waveform data amplified by the amplifier 70 to acquire an average voltage (DVavg) corresponding to the central frequency of the demodulation signal. In digital modulation, an unmodulated signal or a preamble signal of a predefined pattern is normally transmitted first for synchronization as shown in FIG. 4. In the case of an unmodulated signal, the average voltage (DVavg) corresponding to the central frequency is easily acquired by averaging all of the values measured during a period that the unmodulated signal is transmitted. Even in the case of a "10101010" pattern, the voltage corresponding to the frequency in the case of data "1" is acquired by averaging the sampled values at points of time of 1 or at points of time of 0 during that period. Further, by measuring the same number of samples when the data "1" occurs and when the data "0" occurs and averaging the results of measurement, the average voltage (DVavg) corresponding to the central frequency is acquired.

Figure 5A:
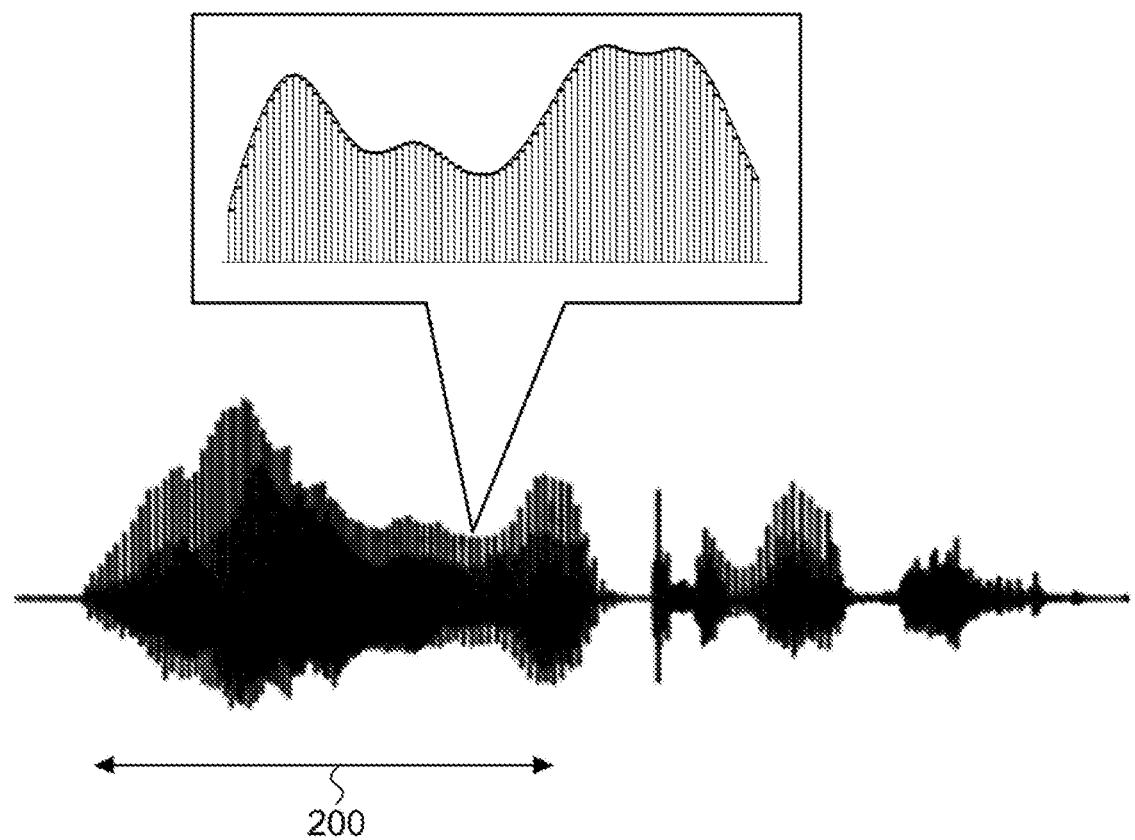
FIG. 5A and FIG. 5B show a further moving average process in the AFC unit in FIG. 1.
Figure 5B:
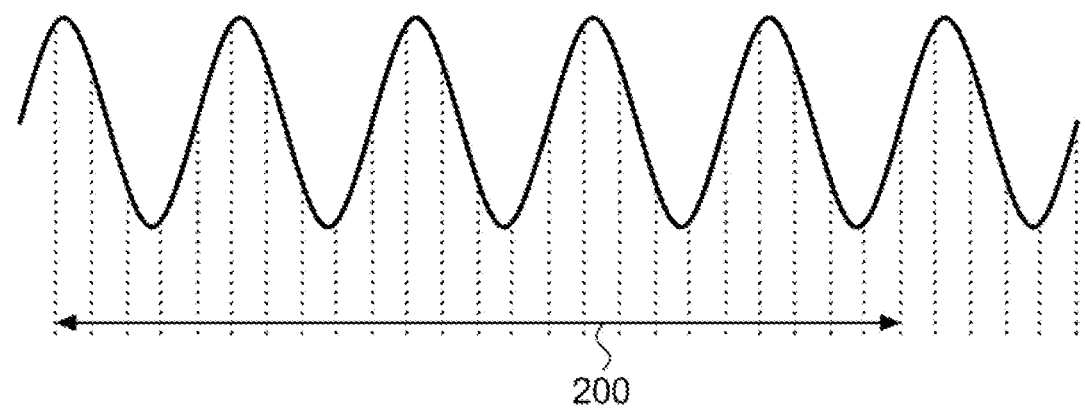

An example of applying the AFC function to an analog radio device will be described below. Even in the case of an analog radio device, the AFC unit 80 acquires the average voltage (DVavg) corresponding to the central frequency of the demodulation signal by calculating a moving average of the digital baseband waveform data amplified by the amplifier 70. FIGS. 5A-5B will be used to explain the interval for moving average. FIGS. 5A-5B show a further moving average process in the AFC unit 80. FIG. 5A shows a time-dependent change of the baseband waveform data amplified by the amplifier 70. An interval 200 of moving average is defined to be one second or longer in order to smooth the baseband waveform data, i.e., a sound signal, sufficiently. FIG. 5B shows a case where tone squelch such as CTCSS is used. In the case tone squelch such as CTCSS is used, the frequency and waveform of the demodulated signal is known in advance. The signal is sampled at a frequency twice the frequency or higher while the tone is being received, and the data for even number of periods indicated by the interval 200 for moving average are averaged. In the case of analog radio devices, the averaging time should be longer than in digital radio devices, but the reception performance is improved by AFC. Reference is made back to FIG. 1.

The AFC unit 80 acquires a voltage induced by the frequency offset by subtracting the zeroth voltage Offset0 from the average voltage (DVavg). This is equivalent to detecting an amount of shift. The AFC unit 80 also calculates the frequency offset $f_{TXoffset}$ as follows by dividing the voltage induced by the frequency offset by the voltage variation amount $\Delta f_{coeff}$ of the demodulation output per unit frequency.

$f_{TXoffset}$=(DVavg−Offset0)÷$\Delta f_{coeff}$

In other words, the AFC unit 80 detects the frequency offset based on the voltage of the signal from the PLL demodulator 34, and the zeroth voltage and the voltage variation detected by the detector 74. Further, the AFC unit 80 causes the signal generator 14 to make a correction for the frequency offset thus detected.

The frequency offset detected by the AFC unit 80 is converted into a voltage by the DA unit 82 to adjust the frequency of the reference signal generator 50 of the signal generator 14 that generates the local oscillation signal. More specifically, the frequency derived from subtracting the frequency offset from the frequency of the local oscillation signal is redefined in the reference signal generator 50 in place of the frequency of the local oscillation signal defined in the signal generator 14 at reception. This corrects for the frequency offset from the transmission side and the frequency offset induced by the Doppler effect associated with the movement of the radio device 100. The IF signal with a small frequency offset is input to the PLL demodulator 34 via the IF filter 32. Therefore, imbalance in the tolerance for waveform distortion and adjacent channel interference is corrected. As a result, the reception performance is improved.

In the case the correction is made by setting a frequency in the signal generator 14, the reception local frequency fLO defined in the signal generator 14 is corrected for the frequency offset. The frequency is therefore corrected by redefining fLO−$f_{TXoffset}$ in the signal generator 14. In the case the correction is made by changing the frequency of the reference signal generator 50, the frequency control voltage and its frequency variation amount of the reference signal generator 50 are learned in advance. This allows the output frequency of the signal generator 14 to be shifted by $f_{TXoffset}$, by offsetting the control voltage of the reference signal generator 50 by a frequency derived from dividing $f_{TXoffset}$ by a frequency division ratio used to define fLO in the signal generator 14.

The FSK demodulator 76 uses the zeroth voltage detected by the detector 74 to perform FSK demodulation. Alternatively, $\Delta f_{coeff}$ may be used.

The features are implemented in hardware such as a CPU, a memory, or other LSI's, of any computer and in software such as a program loaded into a memory. The figure depicts functional blocks implemented by the cooperation of these elements. Therefore, it will be understood by those skilled in the art that the functional blocks may be implemented in a variety of manners by hardware only, software only, or by a combination of hardware and software.

Figure 6:
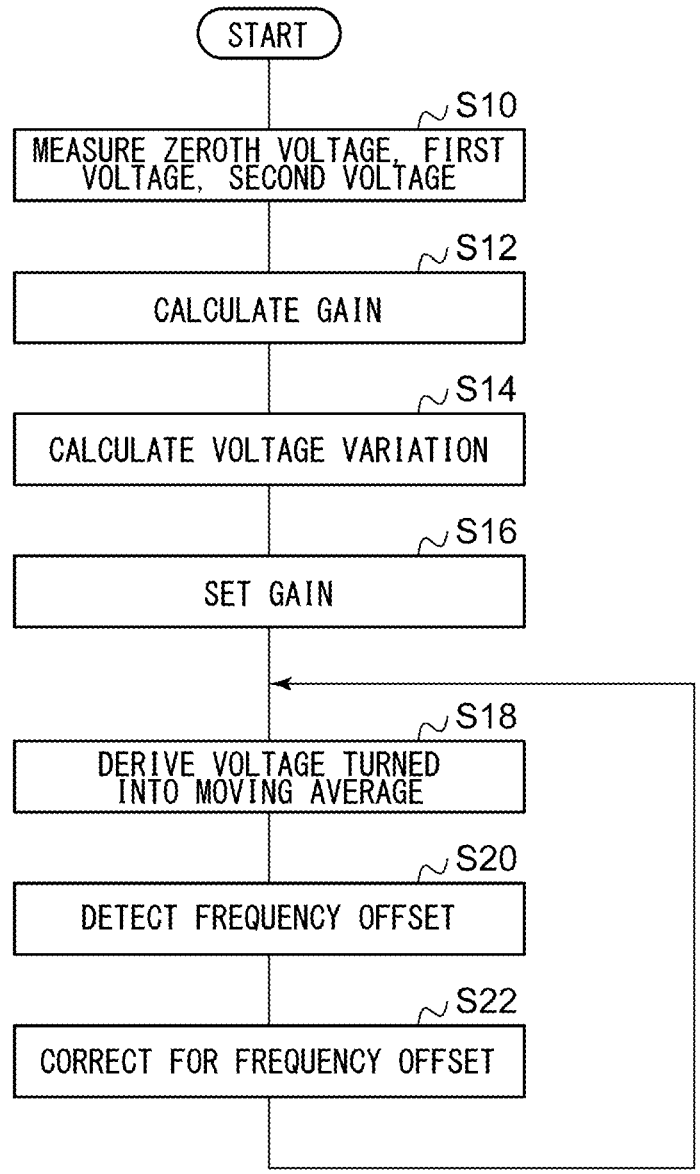
FIG. 6 is a flowchart showing the steps for reception by the radio device of FIG. 1.

A description will be given of the operation of the radio device 100 configured as described above. FIG. 6 is a flowchart showing the steps for reception by the radio device 100. The detector 74 measures the zeroth voltage, the first voltage, and the second voltage (S10). The detector 74 calculates the gain (S12) and calculates the voltage variation (S14). The gain is set in the amplifier 70 (S16). The AFC unit 80 calculates the voltage turned into a moving average (S18) and detects the frequency offset (S20). The AFC unit 80 makes a correction for the frequency offset (S22), and control returns to step 18.

According to the embodiment, the signal generator outputs a signal at the intermediate frequency in the preparation mode, and the signal generator outputs a local oscillation signal in the reception mode. Therefore, calibration and reception are performed by a single signal generator. Further, the amount of shift in the signal from the PLL demodulator is detected in the preparation mode, and the amount of shift detected is used to detect the frequency offset in the reception mode. Therefore, the precision of detection of the frequency offset is improved. Further, since the amount of shift in the signal from the PLL demodulator is detected in the preparation mode, and the amount of shift is used to perform FSK modulation in the reception mode, the precision of demodulation is improved. Further, a correction for the frequency offset is made while calibration and reception are being performed by using a single signal generator. Therefore, the reception characteristics are improved, while also the process is inhibited from becoming complicated at the same time. The signal at the first frequency (f1) and the signal at the second frequency (f2) are output and the voltage variation per unit frequency is detected based on the voltages that occur at these frequencies. Therefore, the process is simplified.

Further, a receiver that uses 4-ary FSK modulation is realized by the PLL demodulator without using an expensive AD converter, DSP, or dedicated IC. Further, a receiver is realized with a simple circuit configuration similar to that of the PLL demodulator. Further, the demodulation levels of an M-ary FSK demodulation signal are corrected so that a correction is made for the ambient temperature or variation in ICs. Further, data decision is performed accurately so that a receiver with a low error rate, i.e., highly-sensitivity is realized. Further, a correction is made for the detected frequency offset so that a highly sensitive digital radio system is built. Further, the zeroth frequency through the second frequency are generated by the signal generator and are input to the PLL demodulator by using the leakage through the mixer so that high isolation from the reception system is maintained. Since high isolation from the reception system is maintained, unnecessary radiation of the signals at the zeroth frequency through the second frequency from the antenna is prevented. Unlike the adjustment performed before shipping, the correction is made when the temperature variation is large or when the device is powered on. It is therefore possible to adapt to the variation in ambient temperature or time-dependent changes. Further, the correction is realized by a signal generator and software so that the manufacturing cost is inhibited from increasing.

Further, the gain is detected in the preparation mode, and FSK demodulation is performed by using the detected gain in the reception mode so that the precision of reception is improved. Further, the gain is detected while calibration and reception are being performed by a single signal generator. Therefore, the reception characteristics are improved, while also the process is inhibited from being complicated. The first frequency (f1) is the highest frequency of the signal output from the mixer, and the second frequency (f2) is the lowest frequency of the signal output from the mixer so that the gain suited to the received signal is set. Further, while the device uses the PLL demodulator, the gain thereof is adjusted every time the device is started. Therefore, M-ary FSK demodulation is performed accurately without using an expensive DSP or dedicated IC. Further, the gain is adjusted every time the device is started so that the number of steps required for adjustment in the production line is reduced. Further, the intermediate frequency signal is generated by the signal generator in the preparation mode and the amount of shift is measured by feeding the intermediate frequency to the PLL demodulator 34 by using the leakage between the input and the output of the mixer. Therefore, the intermediate frequency signal is prevented from leaking via the antenna due to the filter characteristics of the PA to interfere with other radio devices.

Described above is an explanation based on an exemplary embodiment. The embodiment is intended to be illustrative only and it will be understood by those skilled in the art that various modifications to constituting elements and processes could be developed and that such modifications are also within the scope of the present invention.

In the radio device 100 according to the embodiment, a variable gain is set in the amplifier 70, and a correction for the frequency offset is made in the AFC unit 80. Alternatively, however, one of the functions may be omitted. According to this variation, the configuration of the radio device 100 is simplified.

In the embodiment, (3) preparation mode for AFC and (4) preparation mode for setting of gain are performed in the stated order. Alternatively, however, (4) preparation mode for setting of gain and (3) preparation mode for AFC may be performed in the stated order, for example. Alternatively, (4) preparation mode for setting of gain and (3) preparation mode for AFC may be performed in parallel. According to this variation, the flexibility of the process is improved.

In the embodiment, the frequency of the reference signal generator 50 is configured to be variable to correct the frequency of the local oscillation signal. Alternatively, however, the signal generator 14 may be configured such that the frequency thereof is set at a sufficient resolution as in the case of fractional frequency division scheme, for example. In this way, the frequency can also be corrected by setting the frequency division ratio of the frequency divider 58 of the signal generator 14 instead of controlling the frequency of the signal generator 14. According to this variation, the frequency is digitally corrected, the frequency of the reference oscillator 4 is fixed, and the DA unit 82 is unnecessary so that the circuit configuration is simplified. Further, the price of the radio device 100 is reduced.

In the embodiment, the detector 74 adjusts the demodulation levels in the preparation mode. Alternatively, however, the frequency of the local oscillation signal may not be corrected if the frequency offset is small, and the detector 74 may adjust the demodulation levels by reflecting the DC offset corresponding to the frequency error at the transmission side measured during reception, for example. According to this variation, it is not necessary to correct the frequency of the local oscillation signal so that the process is simplified.

In the embodiment, a device other than a variable capacity diode for controlling the frequency with a voltage is used in the VCO 56 of the signal generator 14. Alternatively, however, a variable capacity diode for modulation may be provided separately, and demodulation may be performed by feeding the demodulation signal to the device, for example. Further, in case the signal generator 14 is operated according to the fractional frequency division scheme and includes a delta sigma modulation circuit, modulation may be performed by successively feeding frequency keying data of the modulation signal to the delta signal modulator. According to this variation, the flexibility of the configuration is improved.

In the embodiment, a single signal generator 14 is shared for transmission and for reception. Alternatively, separate signal generators 14 may be used for transmission and for reception. According to this variation, the flexibility of the configuration is improved.

In the embodiment, the detector 74 measures the first voltage at the frequency corresponding to the +3 level and the second voltage at the frequency corresponding to the −3 level. Alternatively, however, the detector 74 may measure only one of the voltages and double the voltage by calculation. The detector 74 may also determine the protocol-dependent difference in FSK keying by calculation. According to this variation, the flexibility of the configuration is improved.

In the embodiment, the detector 74 uses a theoretical value as the design value referred to in detecting the gain. Alternatively, however, the gain may be set at "theoretical value×coefficient" so as to result in the best amplitude obtained from the reception error characteristics in the design stage. According to this variation, the flexibility of the configuration is improved.

In the embodiment, the preparation mode is performed when the device is started. Alternatively, however, readjustment may be performed in response to a temperature variation as a trigger in the case of the radio device 100 capable of measuring the temperature, or readjustment may be performed in response to a power source variation in the case of the radio device 100 that monitors the power source voltage. According to this variation, it is possible to adapt to variation in the PLL demodulator.

What is claimed is:

1. A receiver provided with (1) a preparation mode and (2) a reception mode, the receiver comprising:
a signal generator;
a mixer that is connected to the signal generator and an antenna and outputs a signal at an intermediate frequency;
a PLL demodulator that subjects the signal at the intermediate frequency from the mixer to PLL demodulation;
a detector that detects an amount of shift occurring in the PLL demodulator;
an FSK demodulator that subjects a signal from the PLL demodulator to FSK demodulation; and
an AFC unit that detects a frequency offset in the signal from the PLL demodulator and causes the signal generator to make a correction for the frequency offset detected, wherein in (1) the preparation mode,
the signal generator outputs the signal at the intermediate frequency,
the mixer outputs the signal at the intermediate frequency from the signal generator, and
the detector detects the amount of shift in the signal from the PLL demodulator, and
wherein in (2) the reception mode,
the signal generator outputs a local oscillation signal,
the mixer outputs the signal at the intermediate frequency based on the local oscillation signal from the signal generator and a signal at a radio frequency from the antenna,
the FSK demodulator performs FSK demodulation by using the amount of shift detected by the detector, and
the AFC unit detects the frequency offset by using the amount of shift detected by the detector.

2. The receiver according to claim 1,
wherein in (1) the preparation mode,
the signal generator outputs a signal at a zeroth frequency (f0), a signal at a first frequency (f1>f0), and a signal at a second frequency (f2<f0) in a band of the intermediate frequency,
the detector detects a zeroth voltage in the case of the zeroth frequency (f0) as indicating the amount of shift and detects a voltage variation per unit frequency based on a first voltage in the case of the first frequency (f1) and a second voltage in the case of the second frequency (f2), and
wherein in (2) the reception mode,
the AFC unit detects the frequency offset based on a voltage of the signal from the PLL demodulator and on the zeroth voltage and the voltage variation detected by the detector.

3. A receiver provided with (1) a preparation mode and (2) a reception mode, the receiver comprising:
a signal generator;
a mixer that is connected to the signal generator and an antenna and outputs a signal at an intermediate frequency;
a PLL demodulator that subjects the signal at the intermediate frequency from the mixer to PLL demodulation;
an amplifier that amplifies the signal from the PLL demodulator;
a detector that detects a gain of the amplifier; and
an FSK demodulator that subjects the signal from the amplifier to FSK demodulation,
wherein in (1) the preparation mode,
the signal generator outputs the signal at a zeroth frequency (f0), a signal at a first frequency (f1>f0), and a signal at a second frequency (f2<f0) in a band of the intermediate frequency,
the mixer outputs the signal at the zeroth frequency (f0), the signal at the first frequency (f1>f0), and the signal at the second frequency (f2<f0) from the signal generator,
the detector detects a zeroth voltage in the case of the zeroth frequency (f0) and detects a gain based on a first voltage in the case of the first frequency (f1) and a second voltage in the case of the second frequency (f2), and wherein in (2) the reception mode,
the signal generator outputs a local oscillation signal,
the mixer outputs the signal at the intermediate frequency based on the local oscillation signal from the signal generator and a signal at a radio frequency from the antenna,
the amplifier amplifies the signal from the PLL demodulator by the gain detected by the detector, and
the FSK demodulator performs FSK demodulation by using the zeroth voltage detected by the detector.

4. The receiver according to claim 3,
wherein in the (1) preparation mode,
the first frequency (f1) of the signal output from the signal generator is the highest frequency of the signal output from the mixer in the (2) reception mode, and
the second frequency (f2) of the signal output from the signal generator is the lowest frequency of the signal output from the mixer in the (2) reception mode.

5. A reception method adapted for a receiver including: a signal generator; a mixer that is connected to the signal generator and an antenna and outputs a signal at an intermediate frequency; a PLL demodulator that subjects the signal at the intermediate frequency from the mixer to PLL demodulation; a detector that detects an amount of shift occurring in the PLL demodulator; an FSK demodulator that subjects the signal from the PLL demodulator to FSK demodulation; and an AFC unit that detects a frequency offset in the signal from the PLL demodulator and causes the signal generator to make a correction for the frequency offset detected, the receiver being provided with (1) a preparation mode and (2) a reception mode, the reception method comprising:
in (1) the preparation mode,
outputting, using the signal generator, the signal at the intermediate frequency;
outputting, using the mixer, the signal at the intermediate frequency from the signal generator; and
detecting, using the detector, the amount of shift in the signal from the PLL modulator, and
in (2) the reception mode,
outputting, using the signal generator, a local oscillation signal;
outputting, using the mixer, the signal at the intermediate frequency based on the local oscillation signal from the signal generator and a signal at a radio frequency from the antenna;
performing, using the FSK demodulator, FSK demodulation by using the amount of shift detected by the detector; and
detecting, using the AFC unit, the frequency offset by using the amount of shift detected by the detector.

* * * * *